(12) United States Patent
Daggett et al.

(10) Patent No.: US 8,353,107 B2
(45) Date of Patent: Jan. 15, 2013

(54) TWO-PIECE CABLE STRIPPER

(75) Inventors: Thomas C. Daggett, Dover, NH (US); Joseph E. Bradley, Newfields, NH (US)

(73) Assignee: Uraseal Inc., Dover, NH (US)

( * ) Notice: Subject to any disclaimer, the term of this patent is extended or adjusted under 35 U.S.C. 154(b) by 502 days.

(21) Appl. No.: 12/477,720

(22) Filed: Jun. 3, 2009

(65) Prior Publication Data
US 2010/0000372 A1    Jan. 7, 2010

Related U.S. Application Data

(60) Provisional application No. 61/058,424, filed on Jun. 3, 2008.

(51) Int. Cl.
*B21F 13/00* (2006.01)

(52) U.S. Cl. .............. 30/90.1; 30/91.1; 30/114

(58) Field of Classification Search ............... 30/90.4, 30/91.1, 90.9, 114, 90.1
See application file for complete search history.

(56) References Cited

U.S. PATENT DOCUMENTS

| | | | | |
|---|---|---|---|---|
| 756,857 A * | 4/1904 | Hutchings | ............. | 30/91.1 |
| 2,120,398 A * | 6/1938 | Edwards et al. | ............. | 30/90.6 |
| 2,141,002 A * | 12/1938 | Huff | ............. | 30/90.7 |
| 2,364,397 A * | 12/1944 | Staley | ............. | 30/91.1 |
| 2,627,768 A * | 2/1953 | Cook, Jr. | ............. | 30/91.1 |
| 2,683,308 A * | 7/1954 | Cook, Jr. | ............. | 30/91.1 |
| 3,750,281 A * | 8/1973 | Belling | ............. | 30/90.8 |
| 6,324,945 B1 * | 12/2001 | Lo et al. | ............. | 81/9.44 |
| 6,427,331 B1 * | 8/2002 | Tarpill et al. | ............. | 30/90.8 |
| 6,964,098 B1 * | 11/2005 | Belew et al. | ............. | 30/90.4 |

* cited by examiner

*Primary Examiner* — Omar Flores Sanchez
(74) *Attorney, Agent, or Firm* — Bourque and Associates, PA (57) ABSTRACT

A cable stripper is comprised of two components, each component including a main body portion, a coupling device at one end of the main body portion and a T-shaped handle disposed at an opposite end of the main body portion. The coupling device rotatably couples the two components together. A channel runs along an interior length of each of the main body portions, which provides a path into which the cable to be stripped is inserted. A blade housing on at least one of the components of the main body portion securely holds a utility knife blade with a predetermined amount of the tip or edge of the blade protruding into the channel. The exposed portion of the blade pierces the sheath or covering of the cable by a precise, predetermined amount.

9 Claims, 10 Drawing Sheets

TWO-PIECE CABLE STRIPPER

CROSS-REFERENCE TO RELATED APPLICATIONS

This application claims priority to U.S. Provisional Patent Application No. 61/058,424 filed on Jun. 3, 2008 entitled "Flat Fiber Optic Cable Stripper", which is incorporated fully herein by reference.

TECHNICAL FIELD

The present invention relates to cable strippers and more particularly, relates to a two-piece cable stripper designed to score or penetrate the exterior layer of a cable.

BACKGROUND INFORMATION

The jacket or covering of cables, such as, but not limited to, fiber optic cables, often need to be slit and removed from either the middle or the end of the cables during installation or repair. To accomplish this, a technician generally cuts or slices through the cable jacket using an open faced knife or a makeshift cable stripper. This activity, however, can be difficult and generally requires skill and strength particularly when the cable jacket is made of a hard material and a long length of cable jacket must be removed. The process can cut too deeply into the cable, causing damage to the core of the cable. In the case of fiber optic cables, the optical fiber itself can be damaged by excessive cable twisting or handling. In addition, a knife can slip causing injury to the technician.

Accordingly, what is needed is a cable stripper that allows a user to easily, safely and precisely penetrate the exterior layer of the cable jacket either at an end of a cable or at any point along the length of a cable. The cable stripper should accommodate different types of cable, including, but not limited to, flat cables and round cables. The cable stripper should also be able to accommodate various dimensions of cable.

SUMMARY

The present invention relates to a device for cutting an exterior layer of a cable, the device comprising a first component and a second component, each of the first and second components having a main body portion having a length, an exterior side, an interior side, a first end and a second end opposite the first end. Each of the first and second components include a channel that runs along the entire length of the interior side of the first and second components. The first end of the main body portion of each of the first and second components has a T-shaped handle and the second end of the main body portion of the first component is designed to releasably and rotatably interconnect with the second end of the main body portion of the second component. The first and second rotatably interconnected components are configured for receiving a cable in the channel in the interior side of the first and second components. The invention also includes at least one blade housing, located on the exterior side of at least one of the first and second components within the main body portion, the at least one blade housing configured for securely and removably holding at least one blade in a position such that at least a portion of the at least one blade protrudes into the interior side of the at least one of the first and second components and at least partially into the channel of the at least one of the first and second components on which the blade is located.

A further aspect of the device allows the first and second components to be configured for being disconnected from one another. In order to splice the exterior layer of the cable, the cable is inserted into the device and the first and second components are configured for being rotatably connected and brought into a closed, confronting position whereby the interior portion of the first component contacts the interior portion of the second component. The device is further configured to cut the exterior layer of the cable when the first and second components in the closed position are advanced along a length of the cable.

In a preferred embodiment of the present invention, the first and second components of the device are identical in shape and dimension. The first and second components may be made from a plastic material. The plastic material is preferably an acetyl polymer plastic material which makes it "slippery" against the jacket of the cable to be cut or scored.

A further aspect of the present embodiment of the invention includes a first hingable interconnection member having a circular portion that contains one or more notched depressed areas in a central region of the circular portion. Additionally included is a second hingable interconnection member disposed in a spaced relationship with the first hingable interconnection member and having one or more notched raised areas. The one or more notched raised areas on the second hingable interconnection member of the first and second components are configured to be inserted into or removed from the one or more notched depressed areas of the first hingable interconnection member of the other of the first and second components. In an additional aspect, the first and second components of the device each further include a first arrow on a first side of the second end of the main body portion proximate the first hingable interconnection member, and a second arrow on a second side of the second end of the main body portion proximate the second hingable interconnection member. The arrows are configured for providing a visual indication of a position of the first and second components, wherein the first hingable interconnection member and the second hingable interconnection member can attach or separate only when the first and second arrows align, thereby providing a visual indication of a position when the one or more notched raised areas on the second hingable interconnection member of the first and second components are configured to be inserted into or removed from the one or more notched depressed areas of the first hingable interconnection member of the other of the first and second components.

An additional aspect of the present invention is the formation of a path by the channel of the first component and the channel of the second component when the first and second components are brought into a closed, confronting position against one another. The path that is formed has an oval shape designed to accept a flat, fiber optic cable. Alternatively, the path that is formed can have a round shape designed to accept a round, fiber optic cable.

In another embodiment of the present invention, the channel on each of the first and second components is configured to accept an insert that includes, on one side of the insert, a channel of a desired shape and size.

In a further embodiment of the present invention, the at least one blade housing includes a first blade housing located on the exterior side of the first component and a second blade housing located on the exterior side of the second component.

In an additional embodiment of the present invention, the channel in the second component further includes an opening that allows a portion of the exterior layer of the cable removed by the at least one blade to exit the device.

In another exemplary embodiment of the present invention, the interior portion of at least one of the first and second components includes a plurality of channels that run along the entire length of at least one of the first and second components.

In a second embodiment of the present invention, the device for cutting or scoring the jacket or sheath of a cable comprises a first component and a second component, each of the first and second components having a main body portion having a length, an exterior side, an interior side, a first end and a second end opposite the first end. Each of the first and second components include a channel that runs along the entire length of the interior side of the first and second components. The first end of the main body portion of each of the first and second components has a T-shaped handle, and the second end of the main body portion of each of the first and second components includes a coupling device. The coupling device is configured for releasably and rotatably coupling the first and second components. Also included is a first blade housing, located on the exterior portion of the first component and a second blade housing, located on the exterior portion of the second component, for securely yet removably holding a blade and for allowing a predetermined amount of a tip portion of the blade to project into the channel of the at least one of the first and second components on which the blade is located.

In a further aspect of the second embodiment of the invention, a path is formed by the channel of the first component and the channel of the second component when the first and second components are brought into a closed, confronting position against one another. The path that is formed can have an oval shape designed to accept a flat, fiber optic cable. Alternatively, the path that is formed can have a round shape designed to accept a round, fiber optic cable.

In an additional aspect of the second embodiment of the invention, the channel on each of the first and second components is configured to accept an insert that includes, on one side of the insert, a channel of a desired shape and size.

In another aspect of the second embodiment of the invention, the interior portion of at least one of the first and second components includes a plurality of channels that run along the entire length of at least one of the first and second components.

In a further aspect of the second embodiment of the invention, the coupling device on the second end of the main body portion of each of the first and second components further comprises a first hingable interconnection member having a circular portion that contains one or more notched depressed areas in a central region of the circular portion. The aspect also comprises a second hingable interconnection member disposed in a spaced relationship with the first hingable interconnection member and having one or more notched raised areas. The one or more notched raised areas on the second hingable interconnection member of the first and second components are configured to be inserted into or removed from the one or more notched depressed areas of the first hingable interconnection member of the other of the first and second components.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
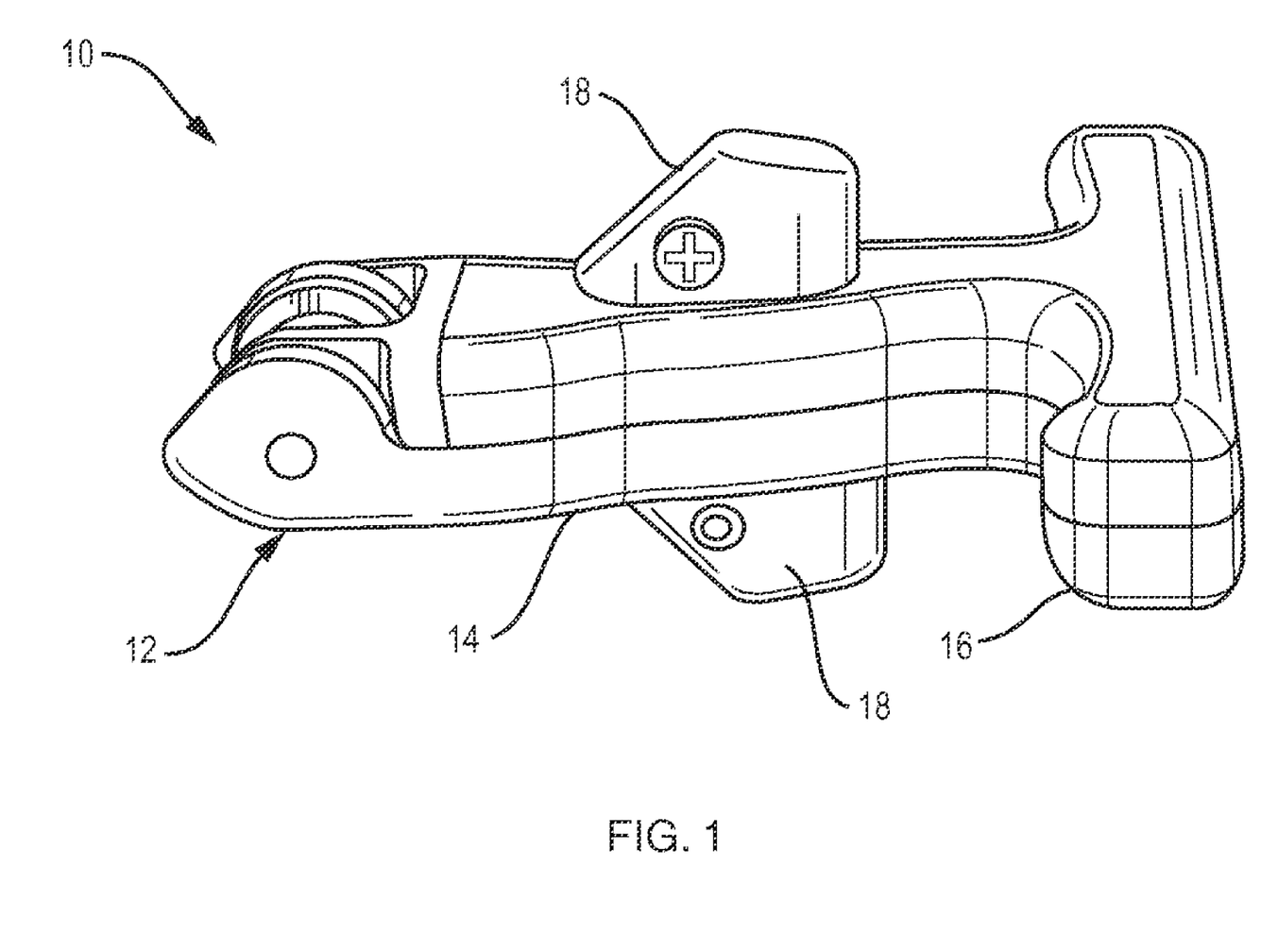
FIG. 1 is perspective view of the cable stripper according to a first embodiment of the present invention.

The cable stripper 10, FIG. 1, in accordance with a first embodiment of the present invention includes a hinge portion 12 a body portion 14 and a T-shaped handle portion 16. The cable stripper 10 is preferably made from a relatively strong, weatherproof, durable material such as plastic, aluminum or composite material. The plastic material is preferably a smooth, high slip material that is self-lubricating, such as an acetyl polymer, which may be provided by Celanese Corporation, or another suitable plastic material. This type of generally "slippery" plastic material facilitates sliding the cable stripper along the length of a cable to be slit. The T-shaped handle portion 16 is arranged perpendicular to the body portion 14. The body portion 14 further includes one or more blade housings 18 that hold and enclose a blade. The blade can be a knife blade, a utility knife blade, a mini blade, or any other suitable blade. The blade is used to penetrate the top, side and/or bottom portion(s) of a cable (not shown). The penetration can be in the form of a cut, splice, slice, or any other means of entering the exterior layer of the cable. The hinge portion 12 allows the body portion 14 to come apart into two pieces allowing the cable stripper 10 to be placed at any point along a given length of cable.

Figure 2:
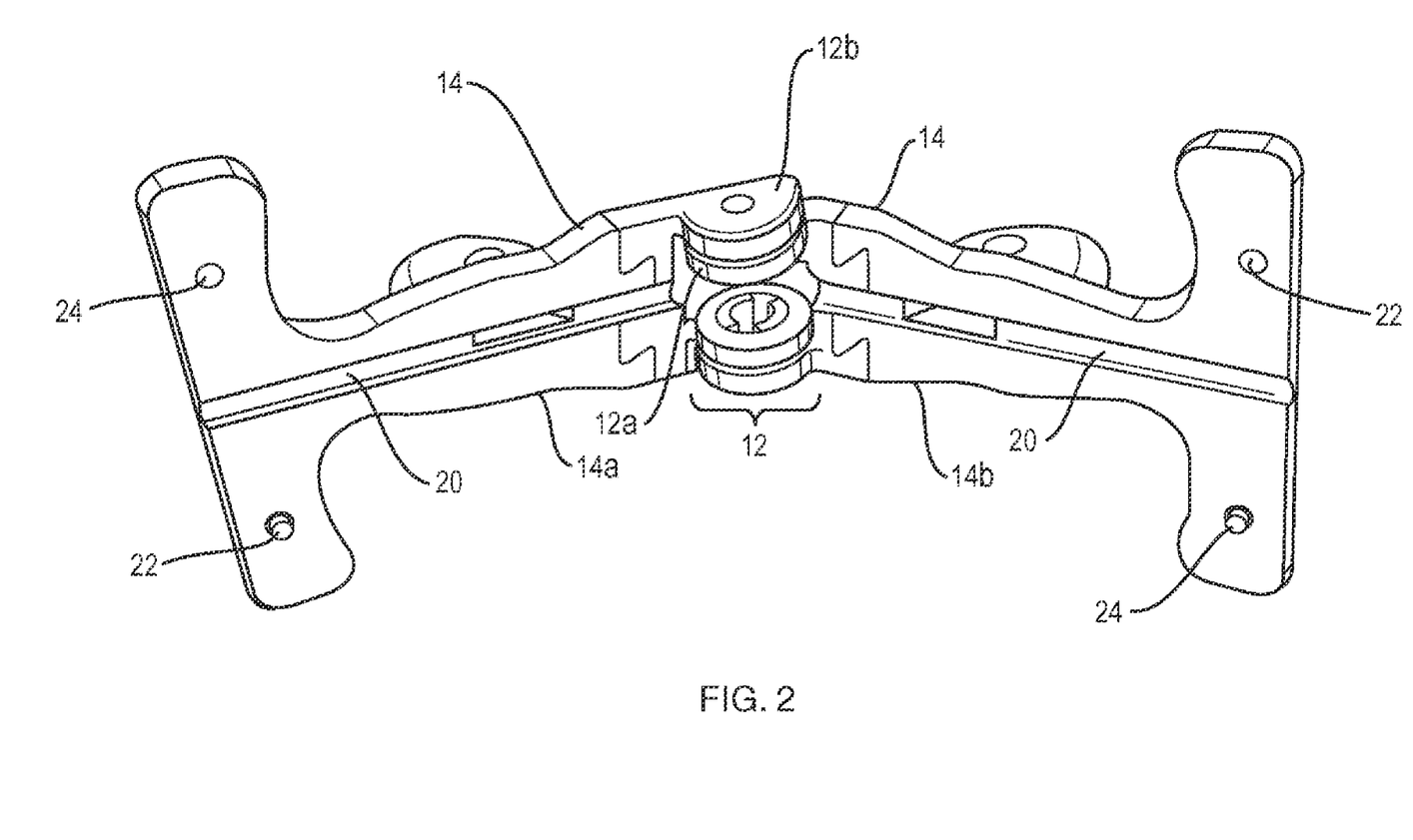
FIG. 2 is a perspective view of the cable splitter according to a first embodiment of the present invention in an opened position.

The body portion 14, FIG. 2, includes a first component 14A and a second component 14B. The first and second components each include a groove or channel 20 into which the cable will fit. The first and second components may contain one channel or they may contain a plurality of channels. The plurality of channels may vary in their size and shape.

The channel can also accept an insert (not shown) that is fitted on one side with a channel of a desired size and shape. Each T-shaped handle portion 16 may also include a protrusion 22 that is sized and shaped to fit into a hole 24 in the opposite position in the other T-shaped handle portion 16 and helps secure the handle portions together when pulling the device along a length of cable. The cable can be a fiber optic cable, a copper cable, or any other type of cable.

The hinge portion 12, FIG. 2, is constructed and arranged such that the first component 14A is separable from the second component 14B allowing the cable stripper 10 to be placed over and around the cable at any point along the cable. The first component and the second component can rotate from an open position (shown in FIG. 2) to a closed position (shown in FIG. 1). In a closed position, the protrusions 22 on the T-shaped handle 16 of the first component, if provided, will insert into the corresponding holes 24, if provided, of the second component and vice versa.

Figure 3:
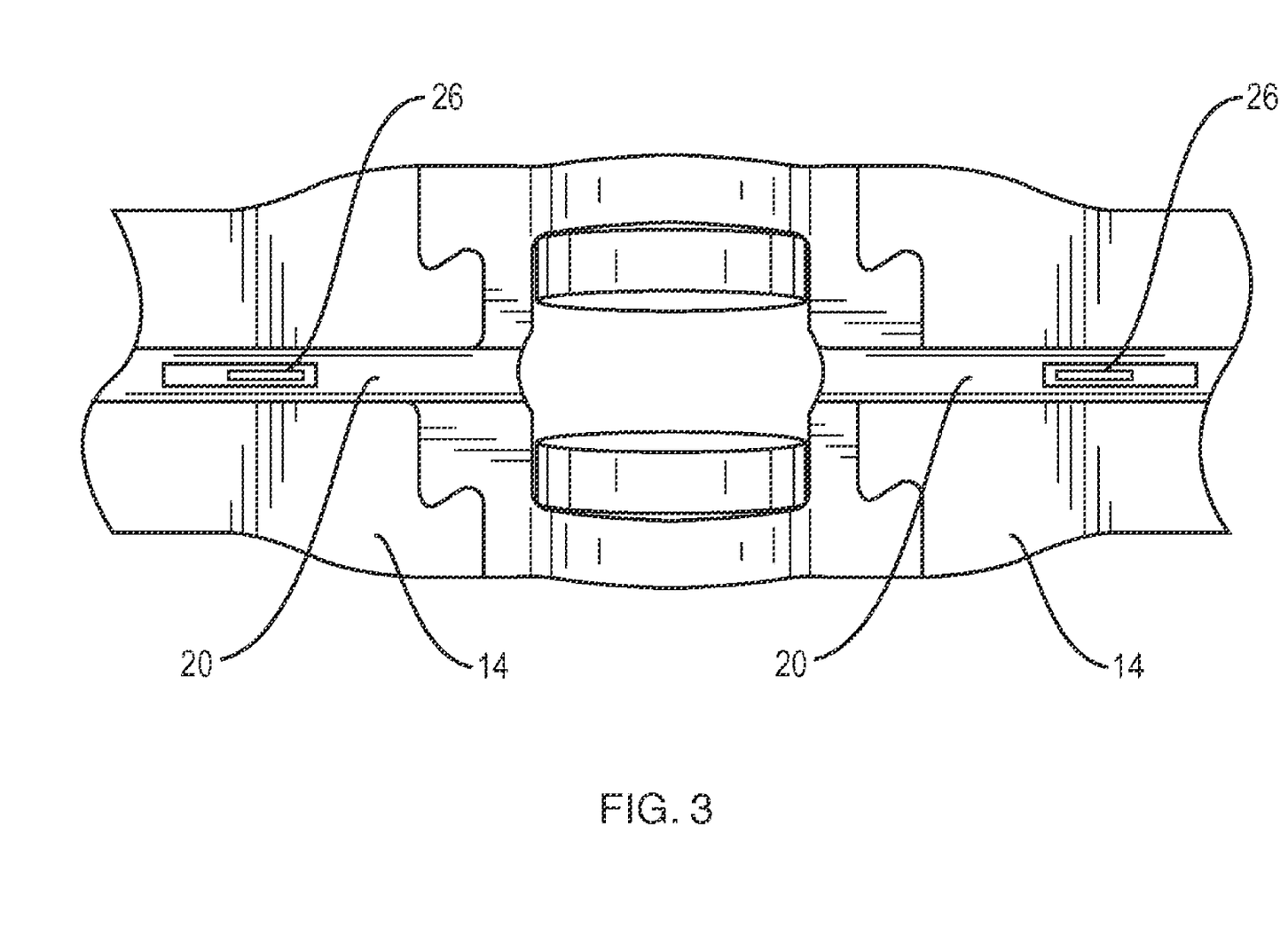
FIG. 3 is a close-up of the interior view of the cable splitter according to a first embodiment of the present invention showing the blade tips.
Figure 4:
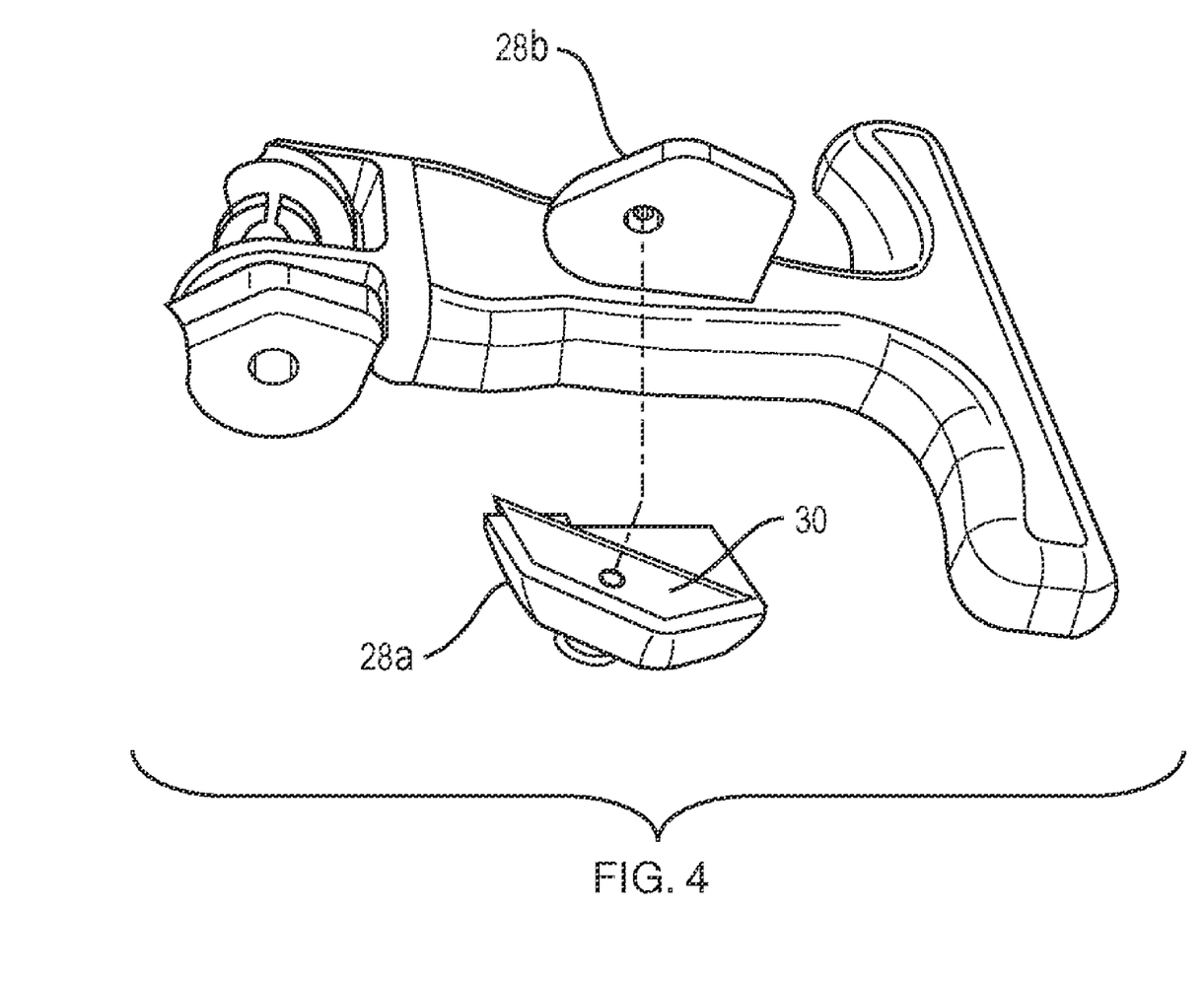
FIG. 4 is a view of the disassembled blade housing of the cable stripper according to a first embodiment of the present invention.

In FIG. 3, blade tips 26 protrude a predetermined amount within the channel 20 in the body portion 14 of the cable stripper 10 according to a first embodiment of the present invention. The blade tip 26 protruding into the channel only goes a predetermined amount or distance into the channel, but does not protrude beyond the top surface of the channel. As a result, the protruding blade tip 26 is contained completely within the channel and cannot cut someone who runs his or her fingertip along the top surface of the body portion 14. The blade housing (18 from FIG. 1), is constructed as a removable portion of blade housing 28A and a fixed portion of blade housing 28B (shown in FIG. 4). The blade housing is sized and shaped to accommodate a blade. The blade can be a standard and readily available single edge utility knife blade available at hardware and department stores or a mini blade, or any other suitable blade. In a first embodiment, a screw passes through the utility blade from a removable portion of the attached blade housing 28A into a corresponding threaded region in the fixed portion 28B of the blade housing (this action is shown by the arrow in FIG. 4). Once the blade 30 is inserted and the removable portion of the blade housing 28A is attached to the fixed portion of the blade housing 28B, the blade 30 will be held at an angle such that only a portion of the blade tip 26 will protrude through the channel 20 (as shown in FIG. 3). In this aspect of the invention, the blade housing has a fixed blade.

In another aspect of the invention, the blade housing allows for an adjustable blade. The adjustable blade can operate on a pivot, with a ratchet, or by any other operable means. The adjustable blade allows the blade tip to operate at variable depths. The adjustable blade may also be a custom adjustable blade. The custom adjustable blade will provide for a plurality of blades that may be color-coded or otherwise marked to allow for easy interchangeability by a user. The custom adjustable blade allows a user to switch the blade easily to allow the user to use the same cable stripper for different cable sizes and shapes.

Figure 5:
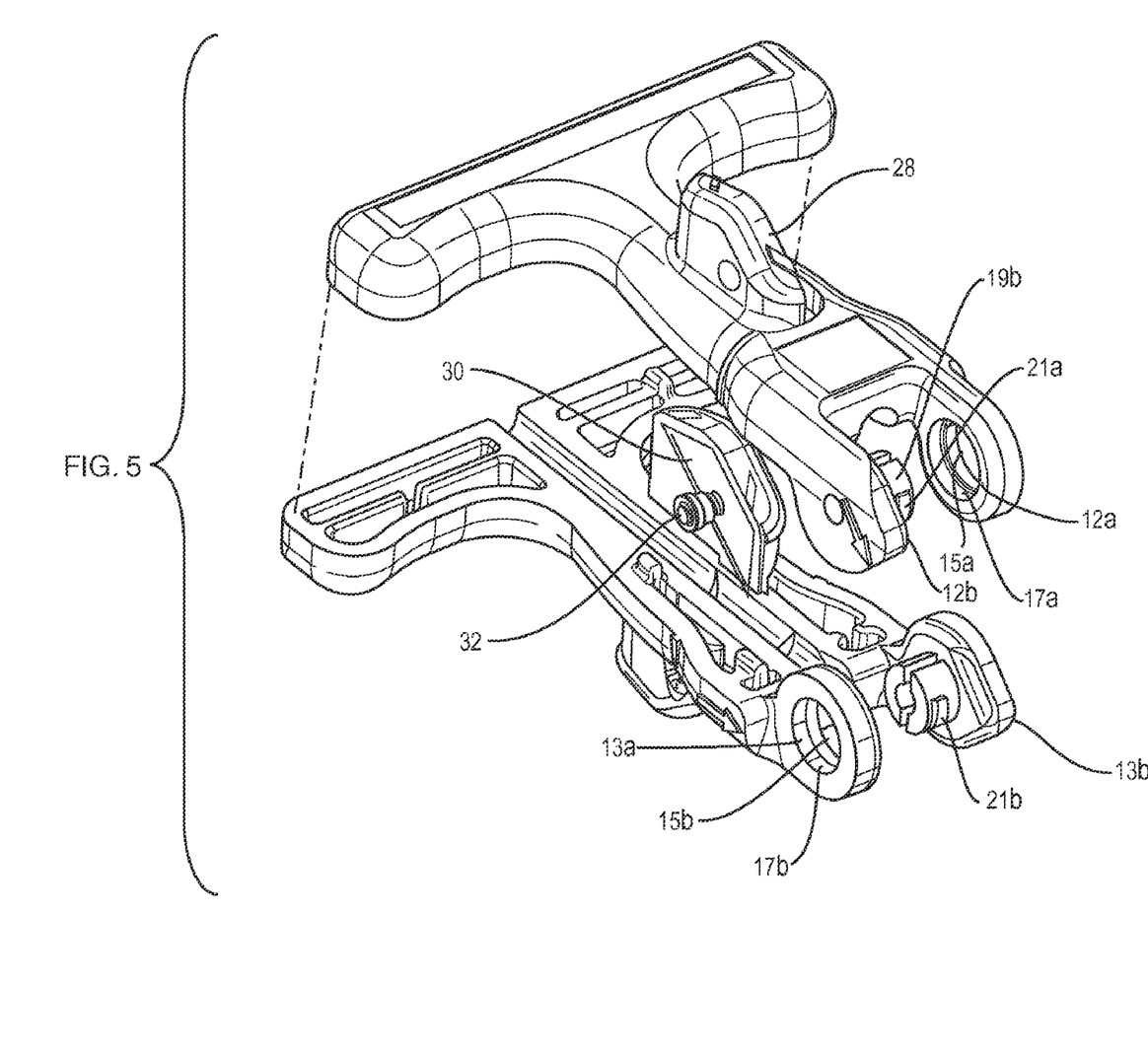
FIG. 5 is a side planar view of the cable splitter of a first embodiment of the present invention as shown from the hinge portion end.

In FIG. 5, the first and second components and corresponding hinge portions are shown in a detached position. The first component and the second component of the first embodiment of the invention are identical and interchangeable. Therefore, the first and second components of the first embodiment of the present invention can be fabricated using the same mold. The hinge portion 12 includes a first hingable interconnection member 12A/13A each having a circular portion 15A/15B that includes one or more notched depressed areas 17A/17B disposed along the circumference of the respective circular portions 15A/15B. If there are two notched depressed areas, they will be preferably located 180 degrees apart on the circumference.

The hinge portion 12 also includes a second hingable interconnection member 12B/13B that each include a protrusion 21A/21B, each of which includes one or more notched raised areas 13B disposed on a peripheral region of the circular portion 19B. The notched raised areas 13B/19B on the second hingable interconnection member 12B are designed and configured to be inserted into the one or more notched depressed areas 17A/17B of the first hingable interconnection member 12A/13A. Once the first component is connected to the second component, a rotatable connection is formed.

Figure 6:
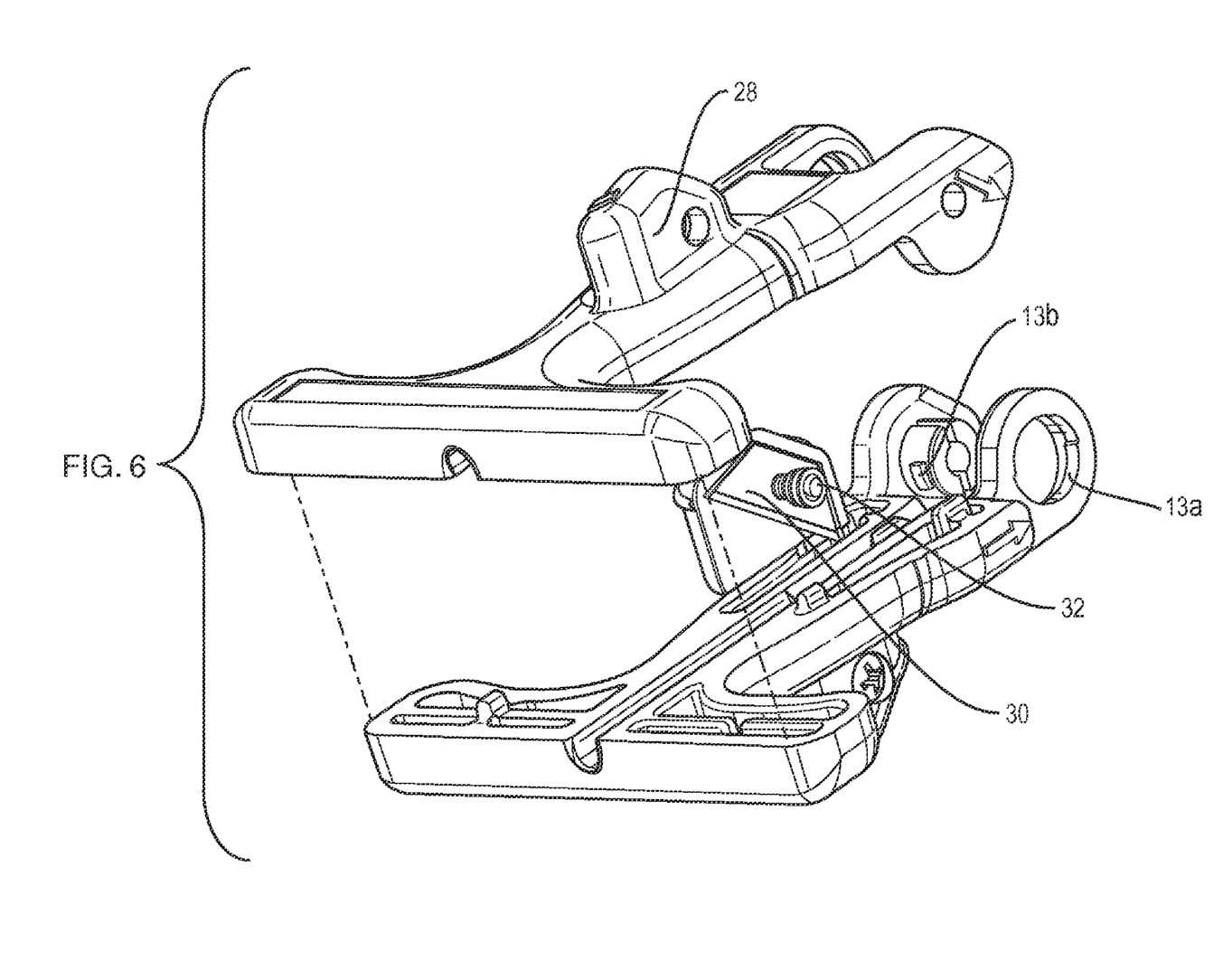
FIG. 6 is a side planar view of the cable splitter of a first embodiment of the present invention as shown from the T-shaped handle portion end.

In FIG. 5, the blade housing is shown in a 3-dimensional format to show the angle of the blade 30 within the blade housing 28. FIG. 6 also shows the first and second components in a detached, spaced apart position. FIGS. 5 and 6 also detail the assembly of the blade housing including the placement of the screw 32 through the removable portion of the blade housing, through the blade, and through the fixed portion of the blade housing.

Figure 7:
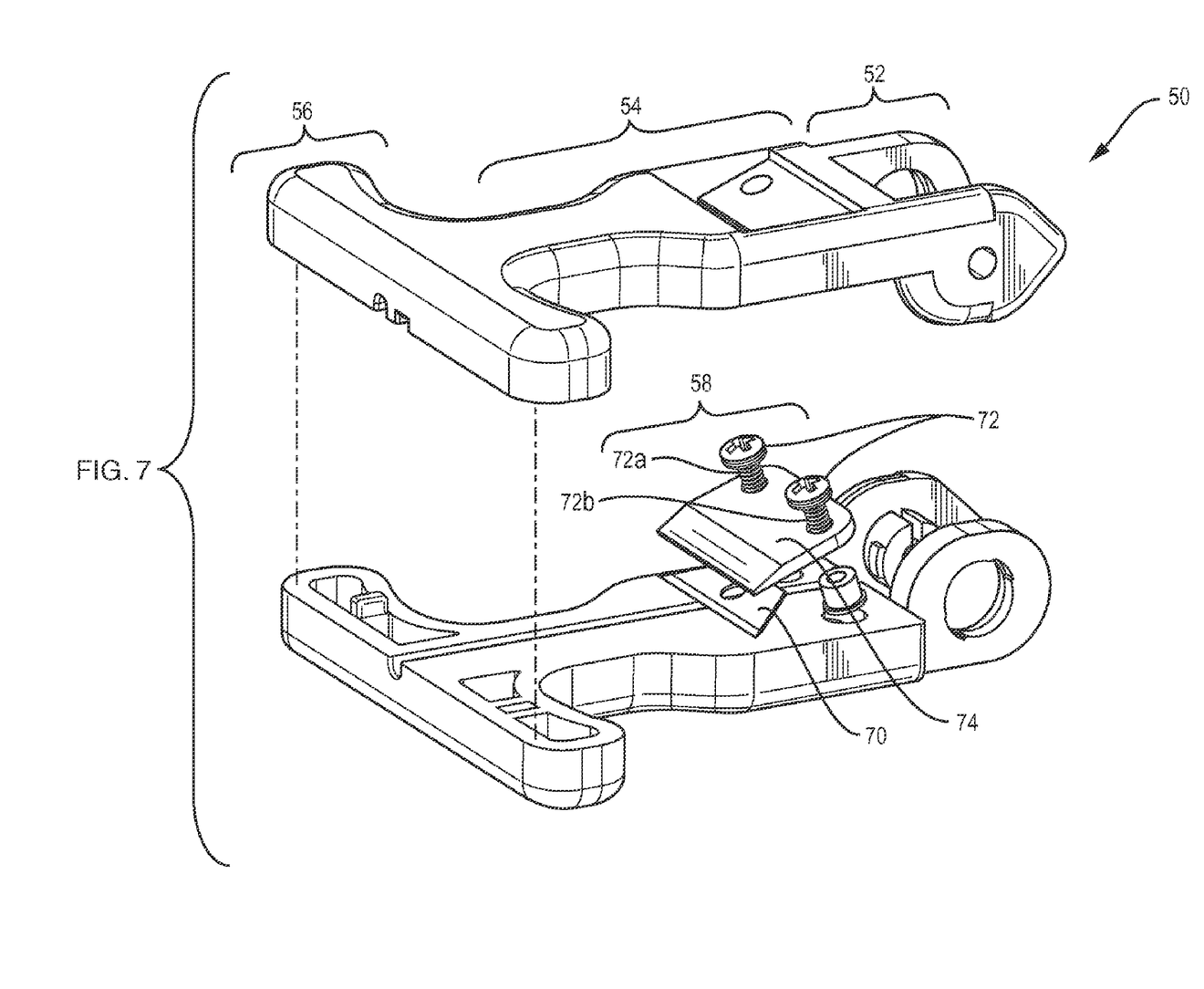
FIG. 7 is a side planar view of the cable splitter of a second embodiment of the present invention.

The cable stripper illustrated in FIGS. 1-6 is designed to slit the top (and/or bottom) region of a cable. The cable is preferably an oval shaped flat cable, such as a flat fiber optic cable. FIG. 7 illustrates a cable stripper 50 of a second embodiment of the present invention having the blade oriented perpendicular to the cable. The cable stripper 50 includes a hinge portion 52, a body portion 54 and a T-shaped handle portion 56. The cable stripper 50 is preferably made from a relatively strong, weatherproof, durable material such as plastic, aluminum or composite material. The plastic material will be an acetyl polymer or other suitable plastic. The T-shaped handle portion 56 is arranged perpendicular to the body portion 54.

The body portion 54 further includes one blade housing 58 that holds and encloses a blade 70 and is located on the first component. The blade may be a knife blade, a utility knife blade, a mini blade, or any other suitable blade. The blade 70 is used to penetrate the exterior layer or sheath of a fiber optic cable (not shown). The penetration can be in the form of a cut, splice, slice, or any other means of entering the exterior layer of the cable. The blade edge 66 protrudes perpendicular to a cable a predetermined amount within the channel 60 in the body portion 54 of the cable stripper 50 according to the second embodiment of the present invention. The blade housing 58 is constructed of a clamping member 74 and one or more screws 72. Preferably the blade is held by a first screw 72A and a second screw 72B. The blade housing is sized and shaped to accommodate the knife blade 70. One or more screws 72 pass through the clamping member 74 into a corresponding threaded region in the blade housing 58. Once the blade 70 is secured, the blade 70 will be held at an angle perpendicular to the channel. In this aspect of the invention, the blade housing uses a fixed blade.

In another aspect of the invention, the blade housing allows for an adjustable blade. The adjustable blade can operate on a pivot, with a ratchet, or by any other operable means. The adjustable blade allows the blade edge to operate at variable depths. The adjustable blade may also be a custom adjustable blade. The custom adjustable blade will provide for a plurality of blades that may be color-coded or otherwise marked to allow for easy interchangeability by a user. The custom adjustable blade allows a user to switch the blade easily to allow the user to use the same cable stripper for different cable sizes and shapes.

Figure 8:
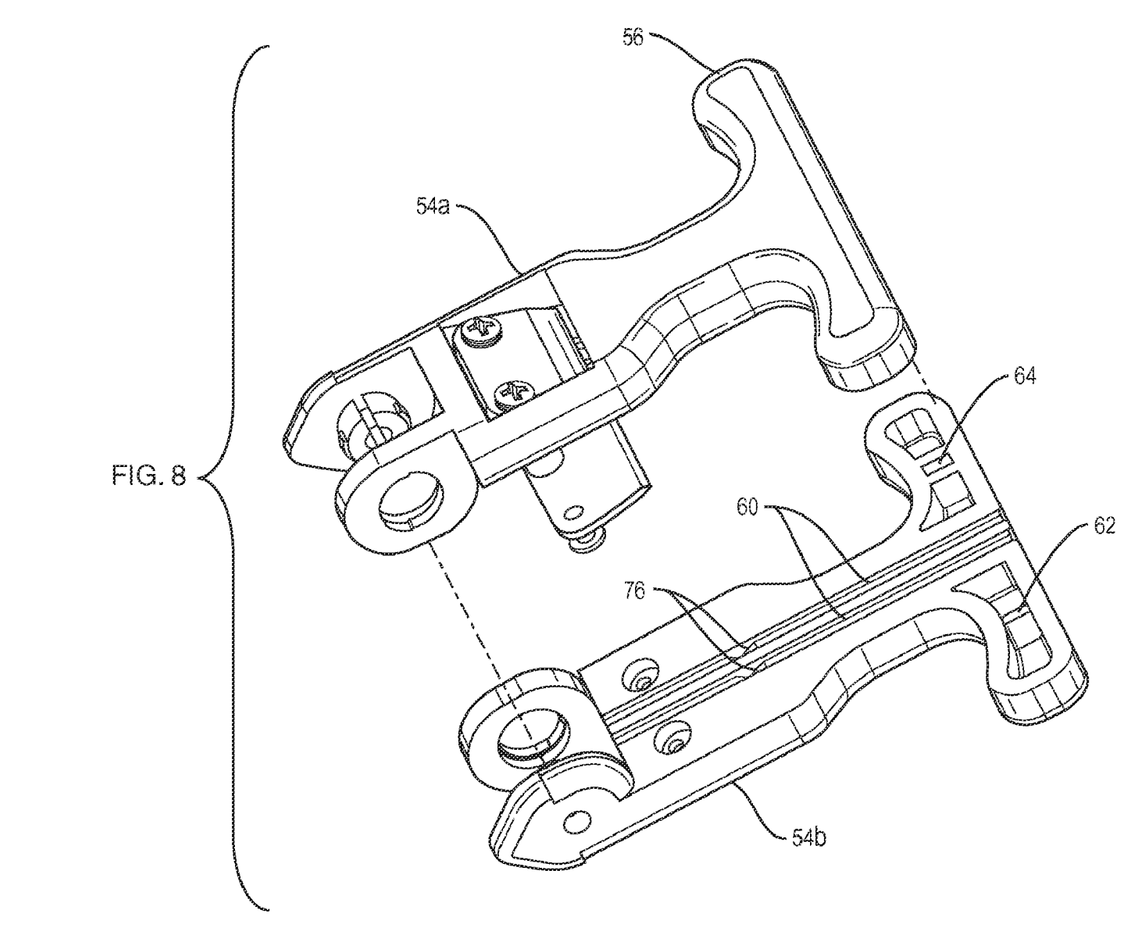
FIG. 8 is a top plan view of the cable splitter of a second embodiment of the present invention.

The body portion 54, FIG. 8, includes a first component 54A and a second component 54B. The first and second components may each include one or more grooves or channels 60 into which the cable will fit. The first and second components may contain one channel or they may contain a plurality of channels. For example, the first component may have one channel and the second component may have two or more channels. Alternatively, one of the components may not contain a channel. The plurality of channels may vary in their size and shape. The channels of either one or both of the first and second components can also accept an insert (not shown) that is fitted on one side with a channel of a desired size and shape. Each T-shaped handle portion 56 may also include a protrusion 62, which is sized and shaped to fit into a hole 64 in the corresponding, opposite position in the other half of the T-shaped handle portion 56, which helps lock the two handles together. The second component may be outfitted with one or more openings 76 that allow a portion of the exterior layer (jacket or sheath) of the cable that has been sliced off by blade 70 to exit the cable stripper 50.

Figure 9:
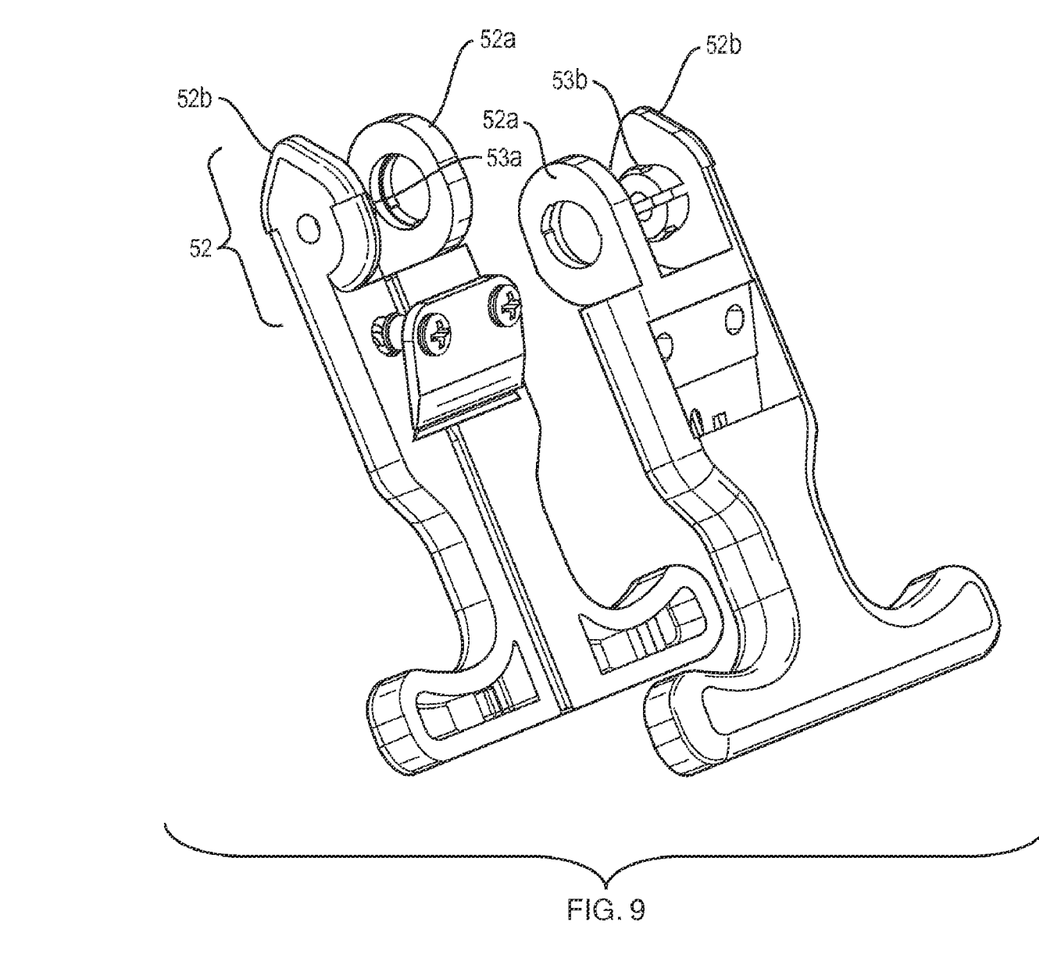
FIG. 9 is a perspective photo of the cable splitter of a second embodiment of the present invention.

The hinge portion 52, FIG. 9, includes a first hingable interconnection member 52A that has a circular portion that contains one or more notched depressed areas 53A disposed within a central region of the first hingable interconnection member. The hinge portion 52 also includes a second hingable interconnection member 52B that contains one or more notched raised areas 53B disposed within a peripheral region of the second hingable interconnection member. The notched raised areas 53B on the second hingable interconnection member 52B are designed and configured to be inserted into the one or more notched depressed areas 53A of the first hingable interconnection member 52A. Once the first component is connected to the second component, a rotatable connection is formed.

Figure 10:
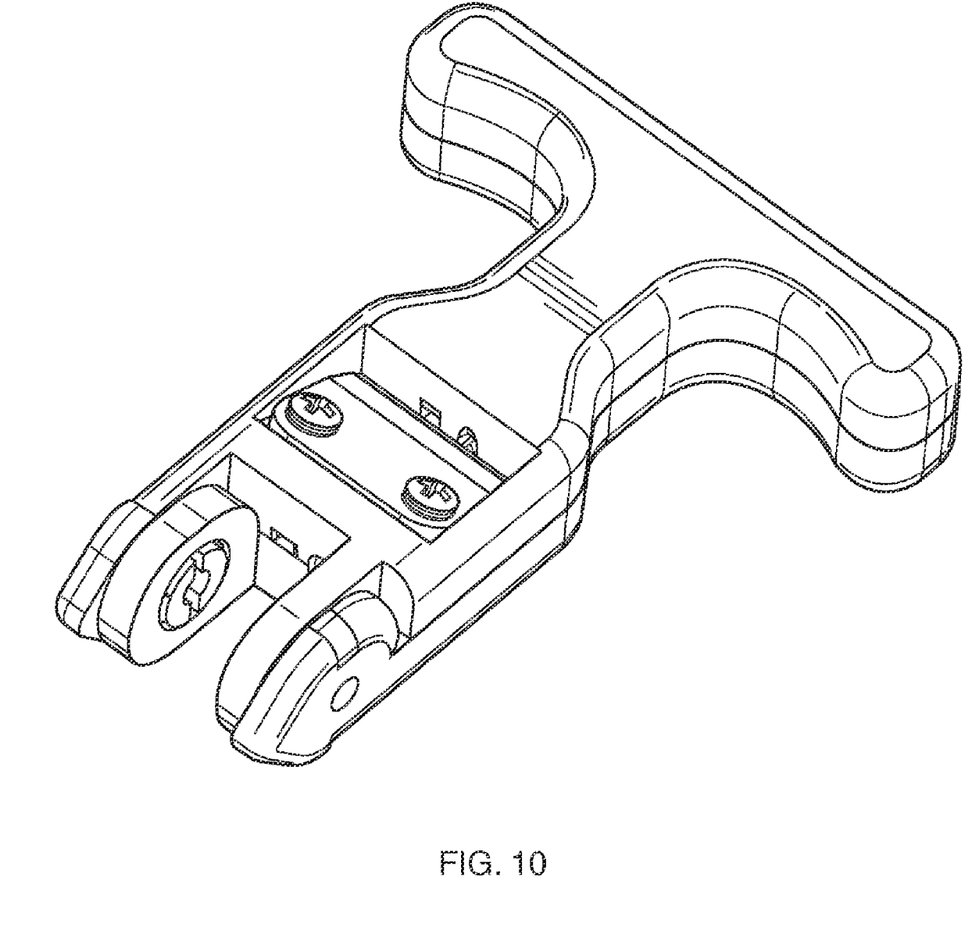
FIG. 10 is a perspective photo of the cable splitter of a second embodiment of the present invention when the two parts are attached.

In FIG. 10, the second embodiment of the present invention is shown in a closed form, with the first and second component attached and rotatably coupled to one another.

The present invention is not to be limited by any preferred or exemplary embodiments or features disclosed herein. Modifications and substitutions by one of ordinary skill in the art are considered to be within the scope of the present invention, which is not to be limited except by the allowed claims and their legal equivalents.

The invention claimed is:

1. A device for cutting an exterior layer of a cable, the device comprising:
   a first component and a second component, each of the first and second components having a main body portion having a length, an exterior side, an interior side, a first end and a second end opposite the first end;
   each of the first and second components including a channel that runs along an entire length of the interior side of the first and second components;
   wherein the first end of the main body portion of each of the first and second components has a T-shaped handle and wherein the second end of the main body portion of the first component is designed to releasably and rotatably interconnect with the second end of the main body portion of the second component for forming a releasable and rotatable hinge between the first and the second component, said releasable and rotatable hinge including a hinge axis oriented perpendicular to said length of said main body portion of said first and second components, and wherein the first and second rotatably interconnected components are configured for receiving a cable in the channel in the interior side of the first and second components; and
   at least one blade housing, located on the exterior side of at least one of the first and second components within the main body portion, the at least one blade housing configured for securely and removably holding at least one knife blade in a position such that at least a portion of the at least one knife blade protrudes into the interior side of the at least one of the first and second components and at least partially into the channel of the at least one of the first and second components on which the knife blade is located.

2. The device of claim 1, wherein the first and second components are configured for being completely disconnected from one another whereby the cable to have its exterior layer cut is inserted into the device and wherein the first and second components are configured for being rotatably connected and brought into a closed, confronting position whereby the interior portion of the first component contacts the interior portion of the second component, the device further configured to cut the exterior layer of the cable when the first and second components in the closed position are advanced along a length of the cable.

3. The device of claim 1, wherein the first and second components are made from a plastic material.

4. The device of claim 3, wherein the plastic material is a "slippery" plastic material.

5. The device of claim 1, wherein the second end of each of the first and second components further comprises:
   a first hingable interconnection member having a circular portion that contains one or more notched depressed areas in a central region of the circular portion; and
   a second hingable interconnection member disposed in a spaced relationship with the first hingable interconnection member and having one or more notched raised areas, wherein the one or more notched raised areas on the second hingable interconnection member of the first and second components are configured to be inserted into or removed from the one or more notched depressed areas of the first hingable interconnection member of the other of the first and second components.

6. The device of claim 5, wherein the first and second components each further include a first arrow on a first side of the second end of the main body portion proximate the first hingable interconnection member, and a second arrow on a second side of the second end of the main body portion proximate the second hingable interconnection member, the arrows configured for providing a visual indication of a position of the first and second components, wherein the first hingable interconnection member and the second hingable interconnection member can attach or separate only when the first and second arrows align, thereby providing a visual indication of a position when the one or more notched raised areas on the second hingable interconnection member of the first and second components are configured to be inserted into or removed from the one or more notched depressed areas of the first hingable interconnection member of the other of the first and second components.

7. The device of claim 1, wherein a path is formed by the channel of the first component and the channel of the second component when the first and second components are brought into a closed, confronting position against one another, and wherein the path that is formed has an oval shape designed to accept a flat, fiber optic cable.

8. The device of claim 1, wherein a path is formed by the channel of the first component and the channel of the second component when the first and second components are brought into a closed, confronting position against one another, and wherein the path that is formed has a round shape designed to accept a round, fiber optic cable.

9. The device of claim 1, wherein the at least one blade housing includes a first blade housing located on the exterior side of the first component and a second blade housing located on the exterior side of the second component.

* * * * *